United States Patent [19]

Cretti

[11] Patent Number: 4,756,859
[45] Date of Patent: Jul. 12, 1988

[54] METHOD FOR MANUFACTURING ELEMENTS OF EXPANDED SYNTHETIC MATERIAL HAVING LAYERS OF PARTICULARLY HIGH STRENGTH AND A PLANT FOR IMPLEMENTING SAID METHOD

[75] Inventor: Piero Cretti, Vacallo De Chiasso, Italy

[73] Assignee: Plastbau A.G., Vaduz, Liechtenstein

[21] Appl. No.: 868,138

[22] Filed: May 28, 1986

[30] Foreign Application Priority Data

May 31, 1985 [IT] Italy ................................ 46838 A/85

[51] Int. Cl.⁴ ........................ C08J 9/22; B29C 67/22
[52] U.S. Cl. .................................... 264/45.4; 264/51; 264/DIG. 10; 425/4 R; 425/4 C
[58] Field of Search ............. 264/45.4, 45.1, DIG. 10, 264/51, 53; 425/4 R, 4 C

[56] References Cited

U.S. PATENT DOCUMENTS

| | | | |
|---|---|---|---|
| 2,983,963 | 5/1961 | Jodell et al. | 264/45.4 |
| 3,026,574 | 3/1962 | Takacs et al. | 264/45.4 |
| 3,043,627 | 7/1962 | Torjusen | 264/45.4 X |
| 3,225,124 | 12/1965 | Wallace | 264/45.4 X |
| 3,306,959 | 2/1967 | Berner | 264/45.4 |
| 4,424,177 | 1/1984 | Immel | 264/45.4 X |

FOREIGN PATENT DOCUMENTS

| | | | |
|---|---|---|---|
| 602856 | 8/1960 | Canada | 264/45.4 |
| 2505370 | 8/1976 | Fed. Rep. of Germany | 264/45.4 |
| 2481192 | 10/1981 | France | 264/45.4 |
| 55-46963 | 4/1980 | Japan | 264/45.1 |
| 55-139230 | 10/1980 | Japan | 264/45.4 |
| 56-111645 | 9/1981 | Japan | 264/45.4 |
| 57-47629 | 3/1982 | Japan | 264/45.4 |
| 171946 | 10/1983 | Japan | 264/45.4 |
| 2137133A | 10/1984 | United Kingdom | 264/45.4 |

OTHER PUBLICATIONS

*The American Heritage Dictionary*, Second College Edition Boston, Houghton Mifflin Company, ©1982, pp. 120 and 948.

Primary Examiner—Philip Anderson
Attorney, Agent, or Firm—Bucknam and Archer

[57] ABSTRACT

A method for obtaining expanded polystyrene products comprising portions of comparatively very different densities and thus of different mechanical strengths, in which a first mass of pre-expanded polystyrene beads of greater density is caused to partially cohere by means of steam, the resultant mass is placed in a mould of greater dimensions, said mould is completely filled with polystyrene beads of density less than the preceding, and cohesion is completed therein.

6 Claims, 3 Drawing Sheets

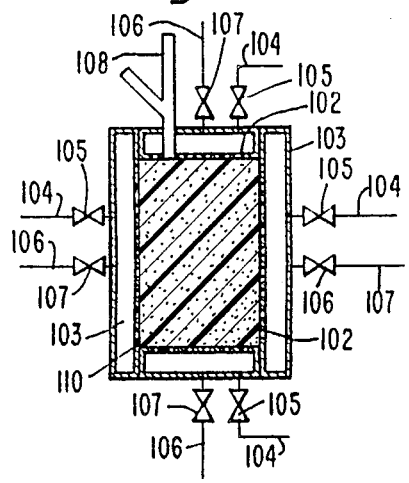
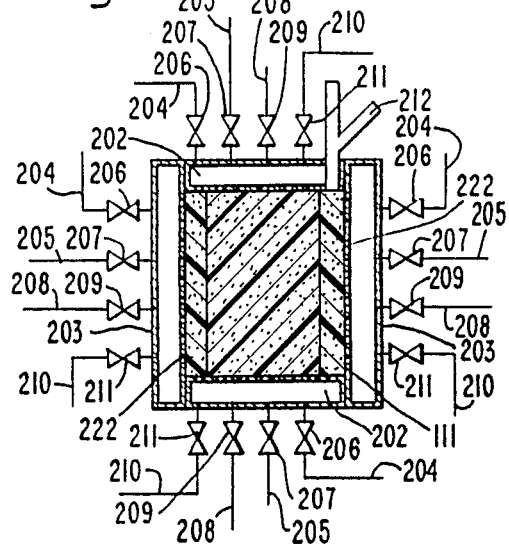
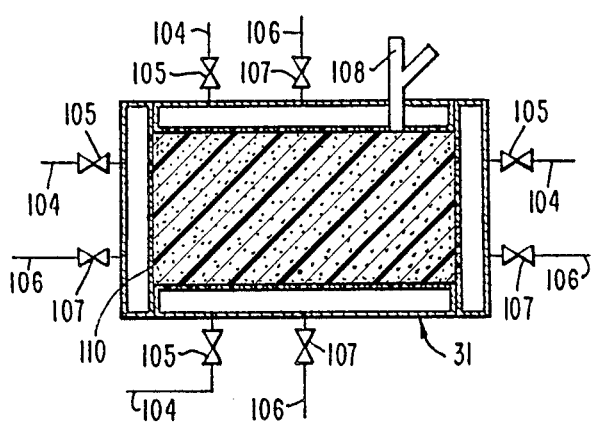
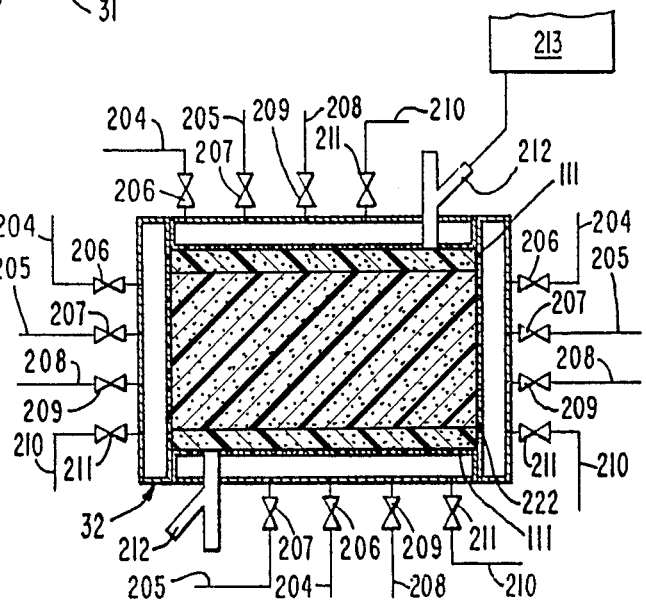

METHOD FOR MANUFACTURING ELEMENTS OF EXPANDED SYNTHETIC MATERIAL HAVING LAYERS OF PARTICULARLY HIGH STRENGTH AND A PLANT FOR IMPLEMENTING SAID METHOD

In the modern building industry, both civil and industrial, and in the packaging field in general, there is an increasingly widespread use made of products or elements of expanded synthetic material, such as expanded polystyrene. This is because such expanded materials offer high thermoplastic insulation, a modest weight, a low cost, and high ageing resistance. However, such materials have particularly poor mechanical characteristics which preclude a more widespread use in said sectors and in others, in which a higher mechanical strength would be required while at the same time still maintaining low cost. This latter requirement precludes the use of products of very high density which while being mechanically strong are too expensive.

Attempts to associate inserts of greater density with low-density polystyrene masses have failed because of the difficulty of ensuring consistency between the mass and the insert. The use of water-based adhesives has given unsatisfactory results because the latter are washed away by the steam used for the expansion. This invention provides and protects a method and plant which allow the low-cost production of expanded polystyrene products which besides possessing the known characteristics of the latter also have good mechanical characteristics, either overall or limited to their outer surface.

The invention also extends to the products obtained by said method and plant, said products having mechanical characteristics comparable to those of wood, including the capacity to retain nails and screws, at least in the stronger regions of the product.

In a first embodiment, the method according to the invention comprises partially expanding, by means of steam, beads of pre-expanded polystyrene having a density of for example between 10 and 100 kg/m$^3$, and then arranging this partially expanded mass in a chamber having a volume greater than the volume of said mass. According to the invention, into the interspace between the chamber and mass there are fed beads of pre-expanded polystyrene having a density very different from the density of the polystyrene forming said partially expanded mass, both the partially expanded mass and said beads of very different density then being completely expanded by means of steam. According to the invention, said partial expansion is substantially of the order of 20% of the maximum expansion attainable by said initial mass of pre-expanded polystyrene, and the densities of the two pre-expanded materials used are in the ratio of between 1:10 and 10:1.

The aforesaid method is implemented by a plant, also covered by the present patent, comprising a first batch moulding or blockmaking machine, with relative circuits for steam and for loading a first pre-expanded material, and a second batch moulding machine containing a chamber having at least one dimension exceeding the corresponding dimension of said first moulding machine, and provided both with the aforesaid circuits and with further circuits for the cooling/stabilisation of the product.

In this manner products of stratified type are obtained having at least one high-strength zone with mechanical and aesthetic characteristics considerably better than those of the adjacent sintered mass, said high-strength zone being firmly bonded to said adjacent sintered mass by virtue of the fact that these latter are formed from two materials which are compatible by deriving from the same base material, and are processed simultaneously.

The products obtained in this manner are of dimensions which depend on their proposed use, and the two pre-expanded materials used can be of different colours in order to obtain products with aesthetic characteristics which have never before been obtained. Moreover, as will be apparent to one expert in the art, such products widen the field of application of such expandable materials both in the known sectors of utilisation and in other sectors. This is due to the fact that, as heretofore stated, the high-strength zones of higher density give the product according to the invention good mechanical characteristics.

In a further embodiment of the method according to the invention, a product of indefinite length can be obtained comprising said zones of different density, and can then be separated into portions of length which depend on their application. According to this further embodiment, a continuous section bar of partially expanded high-density polystrene is created, said section bar is fed to an expansion chamber of greater cross-section, the expansion chamber is then completely filled with polystyrene beads of comparatively much smaller density, and finally the expansion of said section bar and said polystyrene beads is completed in said expansion chamber of greater cross-section. It should be noted that the order of the operations can be reversed, by feeding a partially expanded secton bar of lesser density into an expansion chamber which is to receive polystyrene beads of greater density. The partial expansion is again of the order of 20%, and the ratio of the densities of the materials used is between 1:10 and 10:1.

For this further embodiment of the method according to the invention, the corresponding plant comprises a chamber provided with perforated hollow walls and open at one end, said chamber comprising, starting from the end distant from said open end, a partial expansion zone for a first pre-expanded synthetic material of density between 10 and 100 kg/m$^3$, a moulding zone of length equal to the length of said zone but of greater cross-section, and a terminal sizing zone of length equal to the length of the preceding zones and having a cross-section identical to that of the moulding zone. The partial expansion zone is provided with convenient circuits for the steam and for loading a first pre-expanded material as stated, the moulding zone is provided with circuits for the steam and for loading a pre-expanded material having a density with is comparatively very different from that of said first material, and cirucits for water and air and for applying vacuum to said second zone in order to stabilize the composite product formed in this latter, and the terminal sizing zone of said chamber comprises circuits for water and air, and for applying vacuum for the purpose of sizing the discharging product. The end wall of the partial expansion zone is in the form of a pusher having a stroke equal to the length of said zone. and the end wall of the moulding zone can consist of analogous pusher means for that part exceeding the cross-section of the partial expansion zone.

At this point it is apparent that, according to the required mechanical characteristics, the material of higher density can be provided either on the inside or on the outside of the product, and in this latter case can be provided on one, two or more lateral faces of the product.

Consequently, the term "new industrial products" implies all those products of expanded synthetic material, such as expanded polystyrene, for example in the form of slabs, section bars, solid or hollow blocks, which have at least one portion of density comparatively much higher than the density of the surrounding or adjacent sintered mass, and in which said portion is firmly bonded to said mass in because these latter are constituted by one and the same material.

These and further features of the invention will be more apparent from the detailed description given hereinafter with reference to the accompanying figure which show by way of example two plants for implementing the method according to the invention and for obtaining products with zones of different density.

FIGS. 3 and 4 are diagrammatic cross-sections through the two batch moulding machines shown in the preceding figures.

FIGS. 6 and 7 are sections on the lines VI—VI and VII—VII of FIG. 5.

Figure 1:
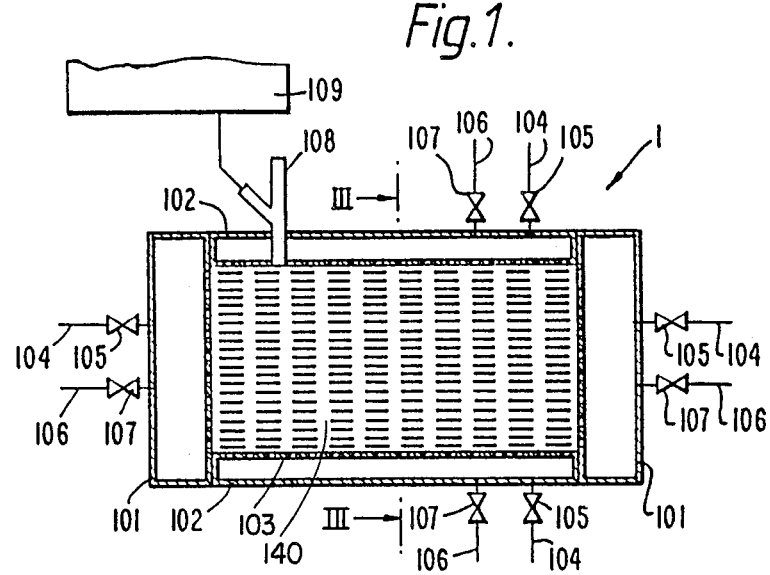
FIG. 1 is a diagrammatic longitudinal sectional view of the upstream moulding machine of a batch plant for implementing the method according to the invention.

From the figures it can be seen that the batch plant according to the invention comprises, disposed in series, a first batch moulding or blockmaking machine 1 (FIG. 1), and a second moulding machine 2 (FIG. 2) entirely similar to the preceding. Said moulding machine comprises two end walls 101, two horizontal side walls 102 and two vertical side walls 103, all of the interspace type and with their inner surface perforated by slots 140. Each of said walls is provided with a pipe 104 fitted with a valve 105 for feeding steam, and a pipe 106 fitted with a valve 107 for feeding fluid for cooling/partial hardening.

Even though not shown, at least one of said hollow walls is provided with conventional means, for example hydraulic cylinder piston units, to enable said at least one wall to be moved in order to allow the discharge of the sintered product. No further constructional details of the moulding machine 1 are described, as these are well known to experts of this specific sector.

As can be seen in FIGS. 1 and 3, a normal loader 108 is associated with the upper horizontal wall 102 of the moulding machine, and is connected to an overlying container 109 of pre-expanded synthetic material, for example pre-expanded polystyrene beads. According to the invention, this latter material has a density of between 10 and 100 kg/m$^3$.

Similarly to the moulding machine 1, the moulding machine 2 comprises two end walls 201, two horizontal side walls 202 and two vertical side walls 203, all of hollow type and with their inner surface perforated by slots 140. In contrast to the moulding zone 1 (see FIGS. 3 and 4), the moulding zone 2 has a larger internal width than the moulding machine 1, the other internal dimensions of the two moulding machines being identical. It should also be noted that each moulding machine can be provided with one or more perforated, hollow longitudinal male members for forming through cavities in the product, and possibly with an extractor, said elements not being shown as they are of normal type. Each wall of the moulding machine 2 is provided with two pipes 204, 205 fitted with valves 206, 207, for feeding steam and air respectively. In addition, the said walls are each provided with a pipe 208 and valve 209 for feeding water, and a pipe 210 and valve 211 for applying a vacuum to the interior of the moulding machine 2. Finally, the upper horizontal wall 202 is provided with two or more loaders 212 connected to a convenient vessel 213 for containing pre-expanded polystyrene beads having a density which is comparatively very different from that of the mateiral contained in 109. According to the invention, the ratio of the densities of said two materials 150 lies between 1:10 and 10:1.

Obviously, each wall of said two moulding machines 1, 2 can be provided with two pipes of the same function, and the said walls can also be fitted with more than one loader 108 and 212 respectively.

The batch method performed by the aforesaid plant takes place as follows.

The chamber of the moulding machine 1 is filled, by way of 108, with pre-expanded polystyrene beads, for example of density 20 kg/m$^3$, after which steam is fed in through 104, 105, until said starting material has undergone an expansion of about 20%. A product 110 (FIG. 3) is obtained by this means which is partially sintered, ie of sufficient strength to be able to be handled. After the partial expansion, the product 110 is cooled for example by air fed through 106, 107, in order to make the product 110 sufficiently rigid, after which the moulding machine 1 is opened to enable the product to be unloaded and disposed in the moulding machine 2. This latter is closed, and pre-expanded polystyrene beads with a density for example of 100 kg/m$^3$ are then fed into the two interspaces between the product 110 and the two side walls 203 of the moulding machine 2. Steam is then fed through 204, 206 to an extent sufficient to cause the two materials to completely expand, after which cooling water is fed through 208, 209, air or another drying fluid is fed through 205, 208, and vacuum is then applied by way of 210, 211. Obviously, during these stages a further partially expanded product 110 will be under formation inside the moulding machine 1.

In this manner, a perfectly stabilized stratified slab is obtained having a central zone 111 of relatively low density, and two opposing lateral zones 222 of relatively high density, these latter being firmly bonded to the central zone 111 by virtue of the fact that they are formed simultaneously with the latter, and from the same material used for forming said central zone 111. Finally, the stratified slab obtained in this manner has good mechanical characteristics, together with an excellent appearance at least at the surfaces pertaining to the zones 222 of greater density. Furthermore, at least one of said zones 222 can be formed from a material of different colour from that of the material of the central zone 111.

It should be noted that the two materials of comparatively very different densities can be used in the reverse manner to that stated heretobefore, this obviously depending on the proposed use of the product. It is also apparent that the dimensions, shape and cross-section of the illustrated product are in no way to be considered limiting because, as stated in the introduction and as known to experts of this sector, the products 111, 222 obtained by the method and plant described heretofore, and the products obtainable with the plant described hereinafter, are suitable for the most widespread uses, for example in both the civil and industrial building sector, in the packaging sector generally, in the household domestic appliance field for forming for example the bases and tops of said appliances, and in the door and window field for forming, for example, doors for interior use, window roll shutter boxes and other articles.

It should also be noted that if the zones 222 of relatively high density are situated on the outside of the product, this latter also has the advantangeous characteristic of retaining nails or screws, which makes it suitable for forming a very wide range of articles.

Moreover, with reference to the accompanying FIG. 4, it is apparent that the two zones 222 of relatively high density can be of different thicknesses, and the zones 222 can also be provided either on just one side of the product, or on three or four sides, and also at the ends thereof so as to completely enclose the relatively low density zone 111.

If four side layers 222 of relatively high density are to be formed, suitable slidable pegs are provided on the lower horizontal wall 202 of the moulding machine 2, in order to support the product 110 at a suitable distance from the moulding machine.

Figure 5:
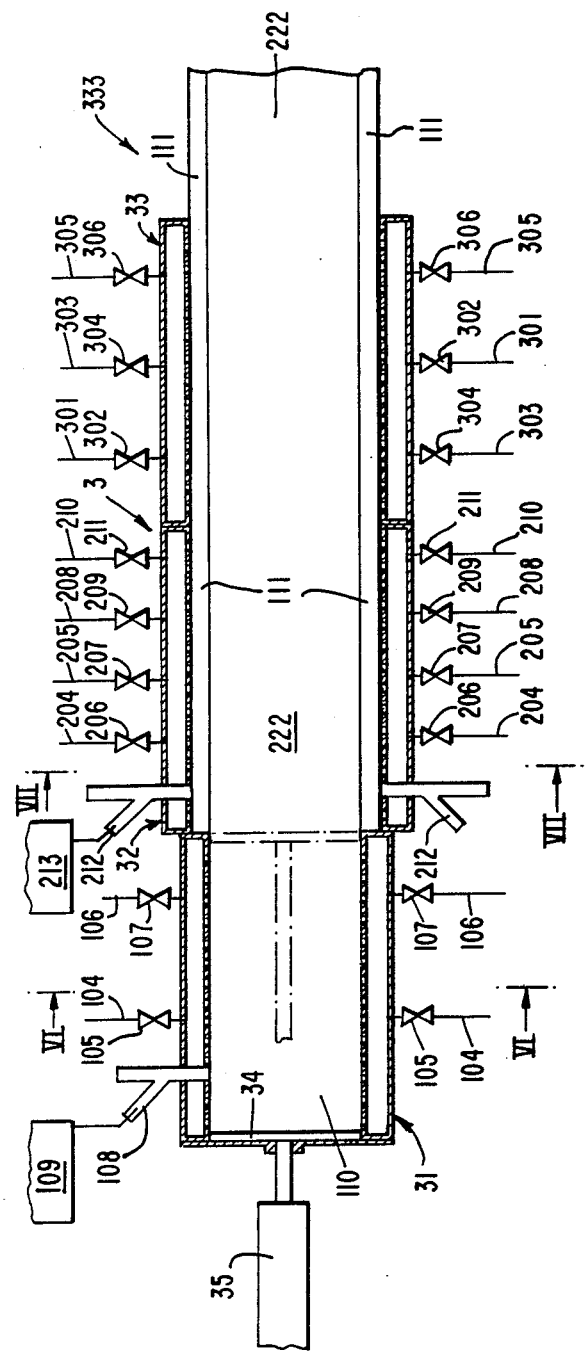
FIG. 5 is a diagramamtic longitudinal section through a continuous plant for implementing the method according to the present invention.

The continuous plant for implementing the method according to the invention, shown in FIGS. 5 to 7, consists of a moulding or blockmaking machine 3 having an open end (to the right in FIG. 5) and comprising, from upstream to downstream, an initial portion 31 for the partial expansion of a pre-expanded material having a density for example of 80 kg/m$^3$, an intermediate portion 32 for the moulding/cooling of the composite product, which has outer zones 111 of density for example 20 kg/m$^3$, and a terminal portion 33 for the stabilization/sizing of the continuous composite product 333 leaving said moulding machine 3.

In order to avoid useless repetition, the service circuits of said initial portion 31 and intermediate portion 32 of the moulding machine 3 uses the same reference numerals as those used for the respective moulding machine 1 and 2 of the batch plant heretofore described.

As shown in FIG. 5, at the upstream end of said initial portion 31 there is disposed an extractor 34 driven by a respective hydraulic cylinder-piston unit 35. The terminal portion 33 has a cross-section which is identical to the cross-section of the intermediate portion 32, whereas the cross-section of this latter is greater, in terms of height as can be seen in FIGS. 6 and 7, than the cross-section of the initial portion 31 of the chamber of the moulding machine 3. Furthermore, said three portions 31, 32, 33 have the same length, this being equal to the working stroke of the cylinder-piston unit 35. Finally, said sizing portion 33 is provided, on each of its side walls, which are of hollow type with their inner surface conveniently perforated, with a pipe 301 fitted with a valve 302 for feeding cooling water, a pipe 303 fitted with a valve 304 for feeding drying air, and a pipe 305 fitted with a valve 306 for applying vacuum to said terminal portion 33.

The continuous method performed by this plant takes place as follows.

Figure 2:
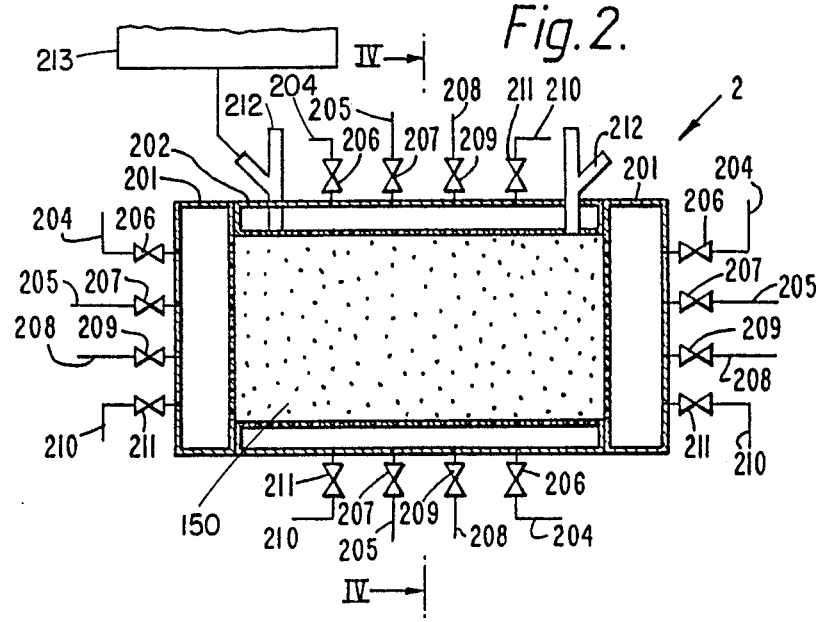
FIG. 2 is a diagramamtic section similar to the preceding, showing the downstream moulding machine of said batch plant.

At commencement of operation, a convenient plug is placed in the moulding portion 32 for temporarily closing the portion 31, after which the pre-expanded polystyrene beads of the stated density of for example 80 kg/m$^3$ are then loaded through 108. About 20% of said material is then expanded, and the partial expanded msass 110 is then cooled, all as described with reference to FIGS. 1 and 3. After this, the extractor 34 urges the partially expanded mass 110 into the intermediate portion 32 of the moulding chamber 3, and then again withdraws as in FIG. 5. At this point the portion 31 is again loaded through 108, and at the same time the loaders 212 fill the two interspaces between 110 and 32 with prexpanded polystyrene beads of density for example 20 kg/m$^3$ as already stated. On termination of said loading, the previously stated stages are repeated in 31, and the expansion and stabilization stages described heretofore with reference to FIGS. 2 and 4 are carried out in succession in 32. The extractor 34 then urges the mass 110 into 32 and the mass 111, 222 into 33, and then withdraws, and the aforesaid stages then take place in the portions 31, 32, while the product 333 is being simultaneously stabilized/sized in the terminal portion 33. Said stabization/sizing takes place by feeding cooling water through 301, then drying air through 303, and then putting the portion 33 under vacuum through 305. The said stages are then repeated in the aforesaid manner in the three portions 31, 32, 33 of the moulding machine 3, to obtain a continuous product 33, the most important characteristics of which have been amply described heretofore together with its possible uses according to the number and location of its most compact or high-strength parts. The continuous product 333 is intended to be then subdivided into portions of suitable length, it being apparent that during the aforesaid operating stages the partially expanded mass 10 becomes firmly bonded to the central zone 222 of the product present in 32, and the two zones 111 present in said portion 32 become firmly bonded to the end of the two corresponding zones 111 contained in the portion 33.

As in the preceding case, the continuous plant described heretofore can also be provided with one or more male members, and with at least one mobile side wall to facilitate the forward movement of the material.

The invention is not limited to the aforesaid, but also covers those improvements and modifications which can be made to the aforesaid methods and means, without leaving the scope of the following claims.

What is claimed is:

1. A method of molding an element of expanded synthetic material of indefinite length, said element having four sides, said element having adjacent zones of different density on at least one side, the density of the adjacent zones being in the ratio between 1:10 and 10:1, said adjacent zones being strongly bonded to one another, which comprises the steps of:
   (a) filling a first chamber, defined by parallel walls which is closed at the first end and the second end thereof with a first mass of a first pre-expanded material beads;
   (b) partially expanding and cohering said first mass beads in said first chamber by means of steam;
   (c) opening said second end and moving said partially expanded first mass from step (b) along the first chamber into a second chamber defined by parallel walls parallel to the first chamber walls, said second chamber being open at both ends, said second chamber having a cross section greater than the cross section of said first chamber and having the first end which coresponds to the second end of the first chamber, the first end of the mass in the second chamber closing the second end of the first chamber;

(d) filling the first chamber with a second mass of the first pre-expanded material beads, equal to the first mass;

(e) filling the interspace defined between the partially expanded first mass and the parallel walls of the second chamber with a third mass of a second pre-expanded material beads, said third mass having a density different from the first pre-expanded material beads;

(f) partially expanding and cohering said second mass beads in said first chamber by means of steam and bonding together the second end of the second mass and the first end of the first mass; and simultaneously (g) completing the expansion and cohesion of the first and third mass in the second chamber, by means of steam to obtain a composite mass having the material in the interior thereof of density different from the exterior thereof;

(h) moving the partially expanded second mass along the first chamber into the second chamber to displace the first end of the second mass to close the second end of the first chamber while advancing the first and third mass to obtain a composite product;

(i) moving said composite product into a third chamber of cross section equal to the cross section of said second chamber to stabilize and size said product by cooling with water, drying with air and application of vacuum;

(j) removing continuously said product from said third chamber and;

(k) repeating said steps (d)–(k).

2. The method according to claim 1 wherein the density of said first mass beads is four times the density of the third mass beads.

3. The method according to claim 1 wherein the density of said third mass beads is four times the density of the first mass beads.

4. The method acording to claim 1 wherein the partial expansion of said first mass continues until approximately 20% of the maximum expansion attainable by said first mass has been reached.

5. The method according to claim 1 wherein said expanded synthetic material is polystyrene beads.

6. An apparatus for the continuous production of an element of expanded synthetic material of indefinite length, said element having four sides, said element having adjacent zones of different density on at least one side, which comprises a first chamber with internally perforated walls, means for introducing a first mass of pre-expanded synthetic material of density between 10 and 100 kg/m$^3$ and steam into said chamber, a second chamber with internally perforated walls and having a cross section larger than the cross section of said first chamber, means for introducing said first mass of pre-expanded synthetic material into said second chamber, and interspace being provided between said first mass of said pre-expanded material and the walls of said second chamber, means for introducing a second mass of said pre-expanded material of density different from the density of said first mass into said interspace, means for introducing steam into said second chamber, a third chamber of same cross section as said second chamber, means for introducing the material from said second chamber into said third chamber, said first, second and third chamber being arranged in series, means for introducing cooling water, drying air and for applying vacuum into said third chamber, and means for continuously removing the material from said third chamber, said first chamber being in the form of a compartment with parallel walls, said first chamber being open at one end and closed at the opposite end of a mobile wall (34), said wall being movable along the entire length of said compartment, said second chamber being in the form of a second compartment (32) with parallel walls, said second chamber being open at both ends.

* * * * *